Feb. 9, 1943. W. T. TABB 2,310,913
VALVE MECHANISM
Filed Aug. 5, 1941 2 Sheets-Sheet 1
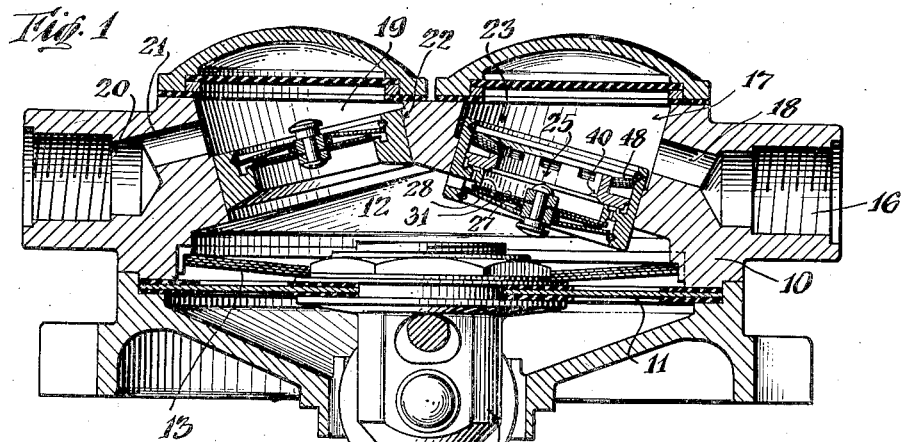
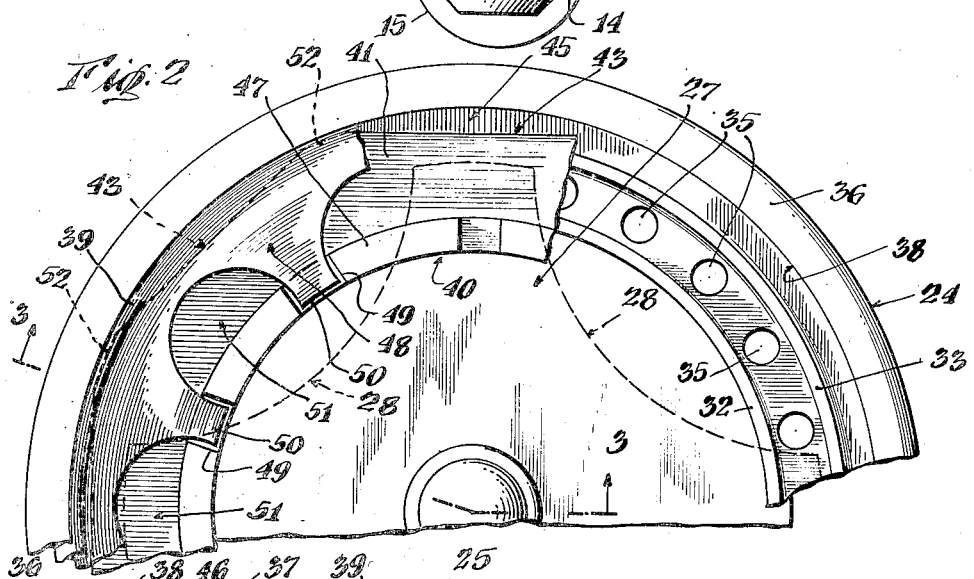
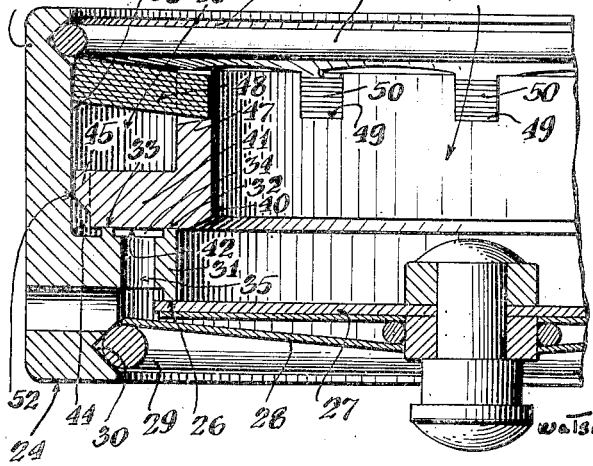
INVENTOR
Warner T. Tabb
BY
Watson, Bristol, Johnson & Leavenworth
ATTORNEYS Feb. 9, 1943. W. T. TABB 2,310,913
VALVE MECHANISM
Filed Aug. 5, 1941 2 Sheets-Sheet 2
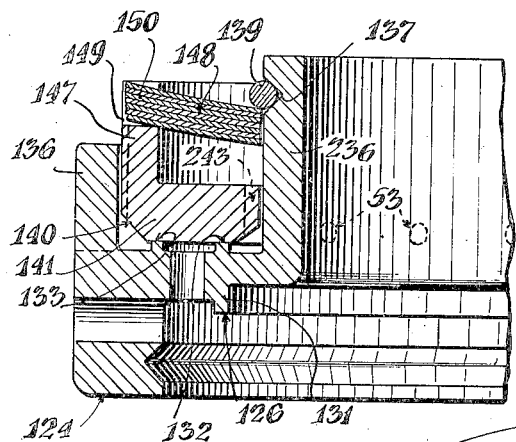
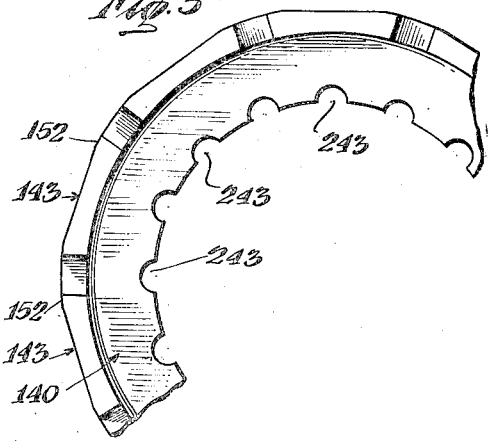
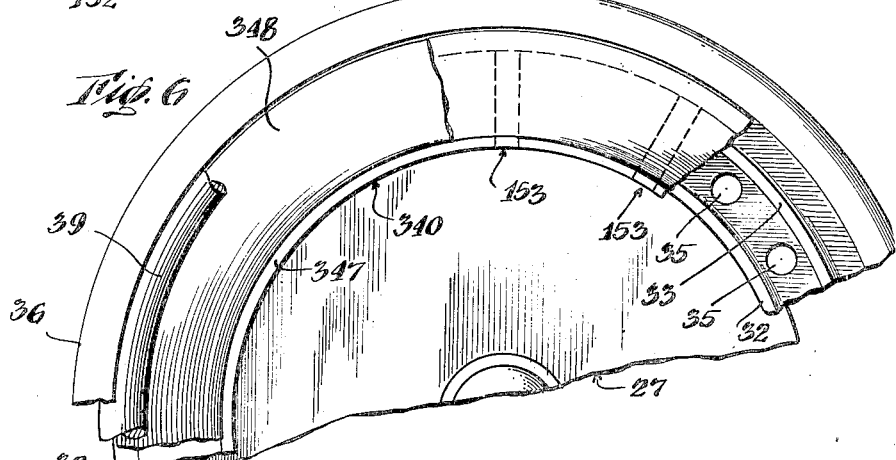
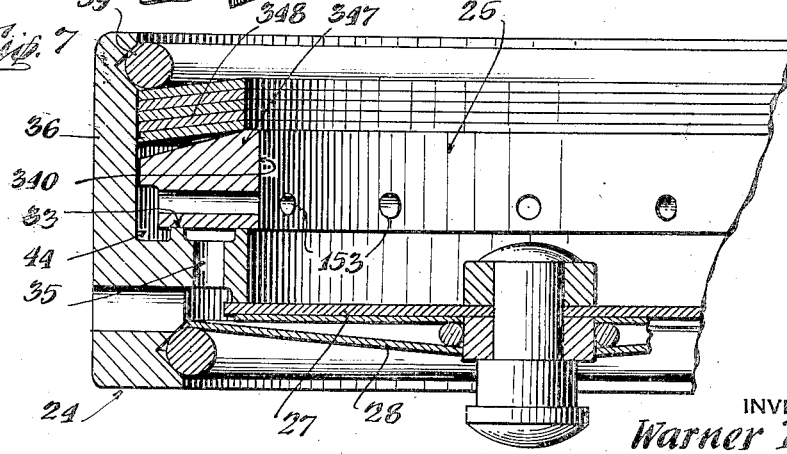
INVENTOR
Warner T. Tabb
BY
Watson, Bristol, Johnson & Leavenworth
ATTORNEYS Patented Feb. 9, 1943

2,310,913

UNITED STATES PATENT OFFICE 2,310,913

VALVE MECHANISM

Warner T. Tabb, Brooklyn, N. Y., assignor, by mesne assignments, to Reconstruction Finance Corporation, New York, N. Y., a corporation of the United States Application August 5, 1941, Serial No. 405,485

10 Claims. (Cl. 277—61)

The present invention relates to valve mechanism and, more particularly, that type of valve adapted for opening under pressure to permit one-way passage therethrough of fluid, either liquid or gaseous.

A general object is to provide such a valve which is of simple and economical construction, having a minimum number of parts assembled in an easy manner without necessitating use of a large number of securing means, which is capable of positive operation with a variety of types of fluids in an efficient manner under various working conditions and which may be associated with a check valve of suitable construction as a unit whereby the mechanism of the present invention may be utilized as a relief valve and/or as a regulator valve.

Another object of the invention is to provide, in a frame or cage of a check valve, mechanism of the present invention so arranged with respect to the check valve that the latter permits flow of fluid in one direction under certain working conditions while such mechanism permits flow in the opposite direction past the check valve under certain conditions of pressure, or vice versa, such check valve and associated reverse flow valve occupying relatively small space while being installable as a unit permitting ready substitution thereof for a single check valve where desired.

A further object of the invention is the provision of such a unit which may be readily installable in a pump of fixed design without necessitating enlargement of parts or alteration of the remainder of the pump structure for accommodation of such relief valve.

An additional object of the invention is to provide such valve mechanism which is very sensitive, is characterized by positive rapid operation, efficient passing of a relatively large amount of fluid with short valve travel, and which permits the ready and efficient use of flat leaf-like spring structure having certain desired characteristics, such, for example, as a "straight-line" spring characteristic or a spring characteristic wherein stiffness increases with deflection.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which:

Fig. 1 is an elevational sectional view of a diaphragm pump showing valve mechanism of the present invention installed therein by way of example;

Fig. 2 is a top plan view with parts broken away of one embodiment of the device of the present invention;

Fig. 3 is a sectional view with parts broken away taken on line 3—3 of Fig. 2;

Fig. 4 is a sectional elevational view with parts broken away of a modified form of the device of the present invention;

Fig. 5 is a top plan view with parts broken away of valve plate structure adapted for use in the device shown in Fig. 4;

Fig. 6 is a top plan view with parts broken away of a further modified form of the device of the present invention; and Fig. 7 is a sectional elevational view with parts broken away of the device shown in Fig. 6.

Like numerals refer to like parts throughout and in Fig. 1 is shown, by way of example, an elevational sectional view of a diaphragm pump in the inlet passage of which is mounted a valve mechanism unit of the present invention to act as a check valve for permitting intake of fluid such as fuel for an internal combustion engine while operating as a relief valve to prevent excessive pressure within the transfer pump in case of stoppage in the outlet line of the pump and as a means for regulating pressure to maintain as nearly as possible uniform hydraulic pressure of the fluid delivered from the transfer pump. The pump briefly comprises a casing 10 closed by a flexible diaphragm 11 cooperating therewith to form a pump chamber 12. The diaphragm is biased by a leaf-like spring structure 13 and provided with an actuating member 14 carrying a cam follower 15. The casing 10 is provided with an inlet passage comprising an internally threaded bore 16 adapted to receive an inlet conduit, a chamber 17 and a passage 18 communicating between the bore 16 and the chamber 17. This casing is likewise provided with an outlet passage comprising a chamber 19, an internally threaded bore 20 and a passage 21 communicating therebetween. In the chamber 19 is mounted a check valve unit 22 permitting flow of fluid into the outlet passage from the chamber 12 when pressure in the latter is built up to a predetermined value by operation of the diaphragm 11. Such pump structure is more fully described in my copending application Serial No. 362,179, filed October 22, 1940. In the inlet chamber 17 is mounted a valve mechanism unit 23 of the present invention.

As shown in Figs. 2 and 3 this valve mechanism unit may comprise a frame or cage member 24 which is circumambient to a fluid passage 25 therethrough. This annular cage 24 may be in the form of a sleeve-like member substantially circular in cross-section but obviously can be of other suitable shapes to be mountable in passages other than those circular in cross-section, for example, rectangular, etc. Obviously the valve frame may be formed by the structure in which is provided the passage wherein is mounted the valve mechanism, rather than being formed by a separate cage member; or part of valve mechanism may be supported on a cage member and other associated valve mechanism mounted on such structure, such cage and structure together constituting the frame.

The cage 24 is suitably provided on one side thereof with a circular seat 26 extending about the centrally located fluid passage 25 through the valve mechanism unit and a valve plate structure 27 which is biased thereto by a plate-like spring structure 28 having peripheral portions thereof fixedly mounted relative to the cage 24 by means of a split ring 29 or the like seated within a groove 30 in the inner face of the cage, as more fully described in my copending application Serial No. 362,180 filed October 22, 1940.

It will be seen that the circular seat 26 is formed upon a radially inwardly extending flange 31 which is provided on the opposite side thereof with a pair of circumambient seats 32 and 33 (which in the specific example are circular) radially spaced apart to provide a continuous intervening space 34 communicating with the first mentioned side of the valve mechanism unit by means of a series of fluid passages 35—35 extending through the flange 31 past the check valve as shown. The dotted lines in Fig. 2 show by way of example how the spring structure 28 may be cut away to provide for flow of fluid past the check valve structure to the passages 35—35.

A portion 36 of the valve cage 24 extends, preferably for an appreciable distance, from the inwardly extending flange 31 and serves as a flange extending substantially parallel to the cage axis. This flange portion 36 serves as anchoring means for mechanism of the relief or regulator valve. For this purpose a groove 37 is provided on the inner face 38 thereof to receive anchoring means such as a split ring 39 which serves as abutment means for biasing spring structure. Other suitable abutment means such as an overhanging member or plate made integral with the flange portion or separate therefrom and secured thereto, or a series of radially inwardly projecting pins, screws or the like, obviously can be used in lieu thereof. The inner face 38 of the flange portion 36 also may serve as a guiding surface for valve plate structure 40 which is adapted to seat against the pair of seats 32 and 33, the valve plate structure being telescoped with this flange for guided reciprocation.

The valve plate structure 40 preferably is arranged about the fluid passage 25 and comprises a circumambient or ring-like valve plate portion 41 having a face 42 thereof bridged across and securely seated as by a lapped joint against the pair of seats 32 and 33. Portions about the periphery of the valve plate portion 41 may be removed or "flatted off," such as at 43—43, to provide for free passage of fluid across the seat 33 when the valve plate portion 41 is unseated therefrom, into the space 44 between the seat 33 and the flange portion 36, through the passages 45—45 provided by flatting off portions at 43—43, and thence into the space 46 provided between the flange portion 36 and an annular flange portion 47 extending substantially axially from the valve plate portion 41 preferably for an appreciable distance. It will thus be seen that the flange portions 36 and 47 are radially spaced from each other a substantial distance with the latter located radially inwardly of the former.

The valve plate structure 40 is suitably biased to the pair of seats 32 and 33 by a spring structure 48 preferably comprising a ring-like laminated structure which may be formed by a plurality of stacked ring-shaped plates of spring steel or other suitable material. This spring structure is circumambient with respect to the centrally disposed fluid passage 25 through the valve mechanism as is the valve plate structure 40 and has inside and outside groups of bearing portions, those on the outside being peripheral thereof and abutting or bearing against the split ring 39.

In the modification shown in Figs. 2 and 3 this outside group of bearing portions merge to provide a continuous bearing or abutting zone but obviously if desired the spring structure may be peripherally serrated or notched to provide spaced apart bearing portions or abutment fingers. In like fashion the inside group of bearing portions may if desired merge to form a continuous bearing or abutting zone adapted to bear against the valve plate structure such as the projecting portion or flange 47 but in the preferred form a series of circumferentially spaced notches 49—49 are provided in flange 47 to receive a plurality of fingers 50—50, each of which is received in one of the notches 49. The notches 49—49 define therebetween a plurality of projecting portions for which may be substituted a series of circumferentially spaced pins between which fingers 50—50 may be seated.

The fingers 50—50 are formed by cutting or dinking out at 51—51 around the inside edge of the spring ring-like plates or laminae. These notches 51—51 not only provide the fingers 50—50 but in addition provide for free passage of fluid from the space 46 between the cage flange 36 and valve plate flange 47 into the passage or chamber in which the valve mechanism unit is mounted. Should it be desired to provide continuous inside and outside bearing or abutment zones for the spring ring-like structure 48 desired passage of fluid may be obtained by forming holes through the laminae of the spring structure.

By flatting off peripheral portions of the valve plate 41 at 43—43 to provide for fluid passages 45—45 guide portions 52—52 are formed on the valve plate 41 which cooperate with the inner surface 38 of the cage flange portion 36 to guide the valve plate structure in operation.

The spring structure 48 in Figs. 2 and 3 is shown cupped downwardly and before being forced into position was provided with a degree of cupping greater than that shown so that when assembled with the plate structure 40 properly seated, force is necessary to flatten it out somewhat to permit mounting of the split ring 39 in the groove 37. Thus the spring is stressed properly to bias valve plate structure to its seats and as will readily be seen is bridged across between the valve cage flange 36 and the valve plate structure flange 47. If desired such spring laminae may be initially flat rather than cupped or may be cupped in the reverse direction, in any case to provide a particular spring characteristic as desired. If the spring structure is cupped as shown a spring characteristic is provided which is substantially the reverse of a coil spring and will thus insure a quick opening action of the valve plate. Further if desired the spring laminae may be sinusoidally shaped, that is, given a wavy formation circumferentially to provide a bending action.

The fingers 50—50 on the inside of the spring ring-like structure 48 may preferably have their tips bearing continuously on a circular line on the valve plate structure 47 to obtain an approximately "straight-line" spring characteristic. As shown in Fig. 3 the bottom surfaces of notches 49—49 are preferably sloped or inclined to provide contact with the fingers 50—50 substantially at the ends thereof. However the bearing surface of the notches 49—49 may be so shaped that the spring fingers when the springs are deflected in installation or by valve movement will have their bearing points altered, that is, these spring finger may during deflection of the spring bear on a surface rather than on a line and the radial distance to the points of contact may vary as the springs are further deflected. This will provide a spring characteristic wherein stiffness increases with deflection which characteristic may also be provided by a flat spring structure as contrasted to the cupped spring structure shown, or a spring structure which is cupped reversely to that shown. Some such alternative structures are shown by way of example in the modified forms depicted in Figs. 4 to 7 inclusive.

In Fig. 4 a valve cage 124 is shown provided with a flange portion 136 which may serve as a guide for a valve plate structure 140 having guide portions 152—152 formed on the periphery thereof by flatting off at circumferentially spaced points 143—143, such flatting off providing for passage of fluid. However, flange 136 may be omitted so that flatting off at 143—143 on the valve plate structure 140 is unnecessary, passage of fluid being provided for by the space between a flange portion 147 of the valve plate structure 140 and the wall of the passage in which the valve cage and mechanism mounted thereon are positioned. The valve plate structure may be guided in reciprocation by a flange 236 formed integral with the radially inwardly extending flange 131 and extending substantially axially of the cage. The valve plate structure 140 will be telescoped with this flange 236 for guided reciprocation and passage of fluid therebetween may be provided by a series of notches 243—243 formed on the inner edge of the valve plate 141. If it is desired to omit the notches 243—243, passage of fluid from across seat 132 may be provided by a series of holes through the flange 236 such as are indicated in dotted lines at 53—53. A notch 137 may be formed in the outer surface of the flange 236 to receive a split ring 139 and a laminated spring structure 148 may be bridged between the flanges 147 and 236, abutting against the split ring 139 on the latter and provided with fingers 150—150 on the outer edge thereof engaged in notches 149—149 in the flange portion 147 of the valve plate structure to bias the latter against its pair of seats 132 and 133.

It will be noted that by having inside portions of the spring structure 148 abutting or bearing against means on the valve cage and outside portions thereof bearing or abutting against valve plate structure the cupped spring structure shown will have a spring characteristic the reverse of that shown in Figs. 2 and 3. The cupping of the spring structure instead of being reduced by unseating action of the valve plate structure will have that cupping increased whereby the stiffness of the spring increases with the deflection.

In Figs. 6 and 7 a further modification is shown wherein valve plate structure 340 is provided on the inner side thereof with an axially extending or projecting portion 347 providing spring abutment means, and passage of fluid across seat 33 is provided for by a series of holes 153—153 formed transversely through the valve plate structure 340. Thus fuel will pass through the passages 35—35 across seat 33 into the space 44 and thence through holes 153—153 to the central passage 25. This makes unnecessary the flatting at certain points of the outside edge of the valve plate structure as in the modification shown in Figs. 2 and 3. Further in this modification the laminae of the spring structure 348 are free from notches, fingers, holes, etc., the inner edge of the spring structure having a continuous bearing on a circular line on the projecting portion 347 of the valve plate structure to provide an inside group of bearing portions merging with each other. In this modification spring structure 348 is cupped reversely to the cupping of the spring 48 shown in Figs. 2 and 3 and thus the stiffness thereof increases with deflection.

The operation of the valve mechanism unit of the present invention is believed to be obvious from the above but for the purposes of clarity it is herein briefly explained. With the valve mechanism unit of the present invention mounted in the intake passage of the transfer pump as shown in Fig. 1, flexing of the diaphragm 11 of the transfer pump inward against the action of the biasing spring structure 13 and then outward by the spring structure, will cause fluid to be drawn in through the inlet passage and the valve mechanism unit 23 therein past the check valve plate structure 27 on the downstream side of the unit 23 into the chamber 12. When fluid pressure is built up in the chamber 12 to a predetermined value the check valve unit 22 in the outlet passage will open and deliver fluid. Thereafter on each outward flexing of the pump diaphragm the outlet check valve will close and the inlet check valve will open to permit fluid to be drawn into chamber 12, and on each inward flexing of the pump diaphragm the inlet check valve will close and outlet check valve will open to provide fluid delivery. The valve plate structure 40 of the relief-regulator valve remains seated against its pair of seats 32 and 33 on the upstream side of unit 23 thereby closing the annular space 34 therebetween against downstream flow. This annular space being connected to the downstream side of the valve mechanism unit 23, that is, to the chamber 12, by the plurality of holes 35—35, is subjected to the pressure that exists within the pump chamber 12. When this pressure becomes excessive the relief-regulator valve structure 40 is lifted off its dual seat against the biasing action of the spring structure 48 and fluid is permitted to flow in the reverse direction or, in this case, upstream. Fluid flows across seat 32 into the centrally located fluid passage 25; and across seat 33 between the valve plate structure 40 and the valve cage flange 36 via space 44, passages 45—45, space 46 and notches 51—51. As previously pointed out passage of fluid across the seat 33 may be via space 44 and a series of holes 153—153 in the valve plate structure, thence to the central passage 25 as in the modification shown in Figs. 6 and 7. Similar provision for passage of fluid across both the seats 132 and 133 is made in the modified structure in Figs. 4 and 5 as indicated above.

It will be understood that the valve mechanism unit of the present invention may, as shown in the drawings and pointed out above, be substituted for the inlet valve in a diaphragm pump such as that described so that while controlling the intake of fluid such as fuel it also serves as a regulator valve to maintain as nearly as possible a uniform hydraulic pressure of fluid delivered from the transfer pump and also as a relief valve to prevent excessive pressure in the transfer pump chamber in case of stoppage in the outlet line from the pump. It will be seen that this structure is simple of construction and provides for ready replacement and substitution whereby such a pump of fixed design previously provided with a single check valve mechanism can be equipped with such a regulator-relief valve without change of pump structure. Of course the valve mechanism of the present invention is not limited to such use and may be put to efficient and effective employment in other structures or fluid passages where the functioning thereof is desired.

Of course it will be understood that in certain instances the positioning of the valve mechanism unit 23 in fluid passage may be reversed with the ring type valve 40 serving to control normal flow in one direction and the plate check valve 27 controlling reverse flow. Further such unit obviously could be used for a variety of purposes, such as for control of the discharge passage of a fuel injection pump with one of the mentioned valve mechanisms preventing back flow and the other permitting such back flow at a predetermined pressure. Of course the ring type valve mechanism is not limited in use to combination with the check valve 27 shown, it being adapted for use with a variety of types of passages which may or may not be controlled by other types of check valves such as those of the gravity load type or one wherein throttling action of the valve itself is depended upon for closing action.

The frame of the valve mechanisms while preferably provided by a cage unit may, if desired, as previously indicated, be formed by the structure through which the fluid passage is formed or that in combination with a cage element. For example, the check valve may comprise a cage press-fitted into a bore or fluid passage having a seat for the check valve structure on one side thereof and a seat or seats for the ring valve mechanism on the opposite side. The biasing spring for the latter may be mounted in the bore such as by a split ring seating in a groove in the bore wall with the latter serving as a guide in the reciprocation of the ring valve. Although not preferred for certain services the spring loading of the ring valve may be had by means of a coil or helical spring in lieu of the laminated or single leaf ring-like spring structure herein more specifically disclosed.

The radially extending fingers of the ring-like spring structure seated in notches in the valve flange cooperate with the intervening projecting portions of the valve flange to prevent relative rotation and of course such projecting portions may be provided by separate members such as pins or the like to provide therebetween spaces to receive the spring fingers. Such projecting portions further assure proper alignment of the laminae with respect to each other so as to make for uniform stressing thereof and to avoid closing of the fluid passing spaces provided therebetween. Such spring structure may further serve as a guide in the operation of the ring valve thereby making possible the omission of guiding flanges or guidance of the ring valve with passage walls of the frame structure. This will be seen to be possible in the structures shown in Figs. 2 and 3, and 4 and 5, with the notches in the ring-like spring structure so formed, as by dinking out on circular arcs as shown or by other methods resulting in notches which become narrower, as to limit lateral movement of the ring valve.

The structure of the valve mechanism of the present invention is such that the relief valve is quick and positive in action, will provide for large passage of fluid with small valve travel and efficient operation thereof can be predetermined and fixed to a precise pressure value.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a valve mechanism, the combination comprising, an annular valve cage having a substantially centrally located fluid passage of appreciable dimension, a circular seat surrounding the central fluid passage, and other fluid passages opening adjacent the seat; a ring-like valve plate structure seated on said seat to control flow of fluid through the last mentioned passages without interfering with flow of fluid through the central passage; and spring means radially outward of the central fluid passage bridged between said cage and said valve plate structure biasing the latter to the seat.

2. In a valve mechanism, the combination comprising, an annular valve cage having a substantially centrally located fluid passage of appreciable dimension, a circular seat surrounding the central fluid passage, and other fluid passages opening adjacent the seat; a ring-like valve plate structure seated on said seat to control flow of fluid through the last mentioned passages without interfering with flow of fluid through the central passage; said cage and said valve plate structure having radially spaced axially extending portions; and a spring structure radially outward of the central fluid passage bridged between said portions biasing said valve plate structure to the seat.

3. In a valve mechanism, the combination comprising, an annular valve cage having a centrally located fluid passage of appreciable dimension, a circular seat surrounding the central fluid passage, and other fluid passages opening adjacent the seat; a ring-like valve plate structure seated on said seat to control flow of fluid through the last mentioned passages without interfering with flow of fluid through the central passage; said cage and said valve plate structure having radially spaced axially extending portions with that of said cage telescoping with said valve plate structure to serve as a guide during reciprocation of the latter; and a ring-like spring structure bridged between said portions biasing said valve plate structure to the seat.

4. In a valve mechanism, the combination comprising, an annular valve cage having a radially inwardly extending flange providing a centrally located fluid passage of appreciable dimension, said flange having other fluid passages extending therethrough, a circular valve seat on said flange adjacent the last mentioned fluid passages, an axially extending flange on said cage, a ring-like valve plate structure telescoped with said flange for guided reciprocation and seated on said seat to control flow of fluid through the last mentioned passages without interfering with flow of fluid through the central passage, said valve plate structure having an axially extending portion radially spaced from said cage flange, and a ring-like laminated spring structure bridged between said cage axial flange and said axially extending portion of said valve plate structure biasing the latter to the seat.

5. In a valve mechanism, the combination comprising, a circumambient valve cage having an inwardly extending flange providing a centrally located fluid passage of appreciable dimension, said flange having other fluid passages extending therethrough, a circumambient valve seat on said flange adjacent the last mentioned fluid passages, said cage having another flange extending axially from said inwardly extending flange, a circumambient valve plate telescoped with said axial flange for guided reciprocation and seated on said seat to control flow of fluid through the last mentioned passages without interfering with flow of fluid through the central passage, said valve plate having a portion extending axially therefrom and spaced laterally of said cage axial flange, a laterally extending abutment on said cage axial flange, and a circumambient leaf spring structure having inside and outside groups of bearing portions with one group engaged beneath said abutment and the other group engaging said axially extending valve plate portion thereby biasing said valve plate to said seat.

6. In a valve mechanism, the combination comprising, a circumambient valve cage having an inwardly extending flange providing a centrally located fluid passage of appreciable dimension, a pair of radially spaced apart seats on said flange, a plurality of fluid passages extending through said flange and opening between said seats, said cage providing a flange extending axially from said inwardly extending flange, a circumambient valve plate telescoped with said axial flange for guided reciprocation and seated on said seats to control the flow of fluid through the last mentioned passages without interfering with flow of fluid through the central passage, said valve plate having a flange extending axially therefrom spaced inwardly of said cage axial flange and being of such shape as to provide for passage of fluid between it and said cage axial flange, and a circumambient leaf spring structure having peripheral portions engaged beneath means on said cage axial flange, said spring structure being notched on the inner edge thereof to provide a plurality of radially extending fingers engaging said valve plate flange thereby biasing said valve plate to said seats.

7. In a valve mechanism, the combination comprising, a circumambient valve cage having a substantially centrally located fluid passage of appreciable dimension, a circular seat surrounding the central fluid passage, and other fluid passages opening adjacent the seat; a circumambient valve plate structure seated on said seat to control flow of fluid through the last mentioned passages without interfering with flow of fluid through the central passage; said cage and said valve plate structure having radially spaced axially extending portions with that of said valve plate structure provided with a plurality of circumambiently spaced projections; and a circumambient plate spring structure having peripheral portions engaged beneath means on said cage axially extending portion; said spring structure having radially extending fingers engaging said valve plate structure extending portion between said projections thereby biasing said valve plate structure to said seat while preventing relative displacement between said spring structure and said valve plate structure; free passage of fluid between said spring structure and said valve plate structure being provided for by said fingers.

8. In a valve mechanism, the combination comprising, a circumambient valve cage having a substantially centrally located fluid passage of appreciable dimension, a circular seat surrounding the central fluid passage, and other fluid passages opening adjacent the seat; a circumambient valve plate structure seated on said seat to control flow of fluid through the last mentioned passages without interfering with flow of fluid through the central passage; said cage and said valve plate structure having radially spaced axially extending portions with that of said valve plate structure provided with a plurality of circumambiently spaced projections; and a circumambient laminated plate spring structure having peripheral portions engaged beneath means on said cage axially extending portion; said laminated spring structure being notched on the inner edge thereof to provide a plurality of radially extending fingers engaging said valve plate axially extending portion between said projections thereby biasing said valve plate structure to said seat while preventing relative displacement between said laminated spring structure and said valve plate structure and between the laminae of the former; free passage of fluid between said laminated spring structure and said valve plate structure being provided for by the notches intermediate said fingers.

9. Valve mechanism comprising, in combination, a frame having opposed sides and a fluid passage of appreciable dimension extending between the opposed sides, a valve seat on one side of said frame circumambient of the fluid passage, a valve plate structure biased to said seat by spring structure held on said frame to control flow of fluid through the fluid passage by permitting flow in only one direction, a valve seat structure on the opposite side of said frame circumambient of the fluid passage, said frame having a second fluid passage open to the first mentioned side thereof to permit flow in the opposite direction past said first mentioned valve seat, a second valve plate structure circumambient of the first mentioned fluid passage with substantially all portions thereof extending laterally outwardly of the fluid passage thereby avoiding material interference with flow of fluid through the first mentioned fluid passage, and other spring structure entirely separate from the first mentioned spring structure also held on said frame biasing said second mentioned valve plate structure to the second mentioned valve seat structure with a predetermined pressure to close the second fluid passage against flow in the first mentioned direction.

10. Valve mechanism comprising, in combination an annular valve cage having opposed sides, a radially inwardly extending flange on said cage between the opposed sides thereof, a valve seat structure on one side of said flange and a valve plate structure biased to said seat structure by a spring structure held on said cage and adapted to permit flow of fluid at a predetermined pressure in only one direction, another valve seat structure on the opposite side of said flange with fluid passages in the latter open to the first mentioned side thereof radially outward of said first mentioned valve structure to permit reverse flow therepast, said cage having a portion on the second mentioned side thereof laterally of said second mentioned valve seat structure extending an appreciable distance substantially axially of said cage, a ring-like valve plate structure cooperating with said second mentioned valve seat structure to close the reverse flow passages against flow in the same mentioned direction and having an annular flange portion spaced laterally from said axially extending portion of said cage and extending an appreciable distance in the same direction, said second mentioned valve plate structure having side portions lying closely adjacent said extending portion of said cage for guidance, and a ring-like stressed spring structure other than said first mentioned spring structure having inside and outside groups of bearing portions with one group seated against abutment means on said extending portion of said cage and the other group seated against abutment means on said valve plate flange biasing said second mentioned valve plate structure to said second mentioned valve seat structure with a predetermined pressure and without materially interfering with flow of fluid in the first mentioned direction.

WARNER T. TABB.